(12) United States Patent
Zhou

(10) Patent No.: US 9,615,355 B2
(45) Date of Patent: Apr. 4, 2017

(54) GROUP RESOURCE RELEASE METHOD, DEVICE AND SYSTEM

(71) Applicant: ZTE CORPORATION, Shenzhen, Guangdong Province (CN)

(72) Inventor: Guoliang Zhou, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/653,446

(22) PCT Filed: Sep. 9, 2013

(86) PCT No.: PCT/CN2013/083138
§ 371 (c)(1),
(2) Date: Jun. 18, 2015

(87) PCT Pub. No.: WO2014/101469
PCT Pub. Date: Jul. 3, 2014

(65) Prior Publication Data
US 2015/0351080 A1    Dec. 3, 2015

(30) Foreign Application Priority Data
Dec. 25, 2012    (CN) .......................... 2012 1 0570612

(51) Int. Cl.
H04W 4/00    (2009.01)
H04W 72/04    (2009.01)
(Continued)

(52) U.S. Cl.
CPC ......... *H04W 72/04* (2013.01); *H04W 72/042* (2013.01); *H04W 76/06* (2013.01); *H04W 72/0486* (2013.01); *H04W 84/042* (2013.01)

(58) Field of Classification Search
CPC ........... H04W 76/066; H04W 36/0016; H04W 36/12; H04W 36/0011; H04W 36/32;
(Continued)

(56) References Cited

U.S. PATENT DOCUMENTS 7,620,017 B2 * 11/2009 Sayeedi ................ H04W 36/12
370/328
2009/0170488 A1 * 7/2009 Becker .................... H04M 3/56
455/416
(Continued)

FOREIGN PATENT DOCUMENTS

CN    101170751 A    4/2008
CN    101931926 A    12/2010
(Continued)

OTHER PUBLICATIONS

3GPP TS 22.468 V0.3.0 (Feb. 2013)—3rd Generation Partnership Project; Technical Specification Group Services and System Aspects; Group Communication System Enablers for LTE; (GCSE_LTE) Release 12. All Pages.*
(Continued)

*Primary Examiner* — Mahendra Patel
(74) *Attorney, Agent, or Firm* — Koppel, Patrick, Heybl & Philpott

(57) ABSTRACT

Disclosed are a group resource release method, device and system. The method includes: an evolved Node B (eNB) determines, from group cells which belong to the eNB, a target cell which needs to release a group resource; and the eNB sends to the target cell a message for instructing to release the group resource, wherein the message for instructing to release the group resource is used for instructing the target cell to release an air interface resource of the target cell and/or a group resource which is allocated to the target cell by the eNB. It is solved by the embodiment of the disclosure the problems that the release speed is slow and the
(Continued)

utilization rate of group call resources in a trunking group call is low, thus effectively improving the utilization rate of the group call resources in the group call.

13 Claims, 5 Drawing Sheets

(51) Int. Cl.
*H04W 76/06* (2009.01)
*H04W 84/04* (2009.01)

(58) Field of Classification Search
CPC ..... H04W 4/005; H04W 76/02; H04W 88/08; H04W 12/06; H04W 4/08; H04W 76/002; H04W 4/06; H04W 76/06; H04W 4/021; H04W 72/02; H04W 84/042; H04W 72/06; H04M 3/56; H04L 12/18
USPC ...................................................... 455/422.1
See application file for complete search history.

(56) References Cited

U.S. PATENT DOCUMENTS

| | | | |
|---|---|---|---|
| 2009/0296675 A1 | 12/2009 | Tenny et al. | |
| 2011/0111753 A1* | 5/2011 | Vainikka | H04W 36/32 455/425 |
| 2012/0302240 A1* | 11/2012 | Tamaki | H04W 36/0011 455/436 |
| 2013/0012192 A1* | 1/2013 | Xi | H04W 36/0055 455/422.1 |
| 2013/0155948 A1* | 6/2013 | Pinheiro | H04W 4/005 370/328 |
| 2013/0230022 A1* | 9/2013 | Guo | H04W 36/0066 370/331 |
| 2013/0272268 A1* | 10/2013 | Xu | H04W 76/066 370/331 |
| 2013/0279375 A1* | 10/2013 | Newberg | H04W 88/16 370/260 |
| 2014/0064177 A1* | 3/2014 | Anchan | H04W 4/08 370/312 |

FOREIGN PATENT DOCUMENTS

| | | | | |
|---|---|---|---|---|
| CN | 101932058 A | * | 12/2010 | |
| CN | WO 2011/134099 A1 | * | 3/2011 | ........ H04W 72/0453 |
| CN | 103037540 A | | 4/2013 | |
| CN | 104284298 A | * | 1/2015 | |
| WO | 2131601 A1 | | 9/2009 | |

OTHER PUBLICATIONS

International Search Report (Form PCT/ISA/210) for PCT/CN2013/083138 mailed Dec. 12, 2013.
Supplementary European Search Report from European Appl. No. 13867133.4, dated Dec. 17, 2015.
Qualcomm Inc. : "GCSE_LTE functional and high level requirements", 3GPP Draft; S1-123008_GCSE High Level Requirements, $3^{rd}$ Generation Partnership Project (3GPP), Mobile Competence Centre; 650, Route Des Lucioles; F-06921 Sophia-Antipolis Cedex; France, vol. SA WG1, No. Edinburgh, UK Nov. 8, 2012-Nov. 9, 2012, Nov. 1, 2012. XP050681959, Retrieved from the Internet: url:http://www.3gpp.org/ftp/tsg_sa/WG1_Serv/TSGS1_60_GCSE.adhoc/docs/[retrieved on Nov. 1, 2012] p. 1. line 10-line 28 p. 2, line 28-line 32.

* cited by examiner

GROUP RESOURCE RELEASE METHOD, DEVICE AND SYSTEM

TECHNICAL FIELD

The disclosure relates to the field of communications, including e.g., a group resource release method, device and system.

BACKGROUND

With the increasing mature of the fourth generation mobile communication Long Term Evolution (LTE) technology, while the trunking communication broadband demand is growing, not only the requirements on voice are required, and the special scheduling communication with the video and high-speed requirement will be the development direction of the further trunking communication system. Therefore, the trunking communication realized by the LTE technology will develop with a broad prospect.

At present, since trunking communication services has technical features of channel sharing, dynamic allocation, etc., the management on a group call wireless resource will be the key of the performance index of a trunking communication system. The group capacity of a trunking system may be improved by an efficient management on the group call wireless resource. For example, after an invalid wireless resource of a trunking group call is released quickly, these released resources may quickly serve for other group calls. In the related art, a base station will release all group resources only when a core network or a user initiates to release the group call resources (i.e. group resources). However, not each established cell resource in the group can be fully used; group call resources of some of the cells therein may be actually in a state of non-used by users. For the trunking communication with the limited wireless resources, a large waste is caused in the case. Particularly, when the current LTE technology is used, since a base station applying the LTE technology is highly flat, and the number of evolved Node B (eNB) will increase rapidly, and the frequent release and construction of the group call resources will become normal in the trunking group call.

For the problems in the related art that the releasing speed of the group call resource in the trunking group call is slow and the utilization ratio is low, effective solutions have not been presented at present.

SUMMARY

A group resource release method, device and system are provided in the embodiment of the disclosure, so as to at least solve the problems in the related art that the releasing speed of the group call resource in the group call is slow and the utilization ratio is low.

According to one aspect of the embodiments of the disclosure, a group resource release method, comprising: determining, by an evolved Node B, eNB, from group cells which belong to the eNB, a target cell which needs to release a group resource; sending, by the eNB, to the target cell a message for instructing to release the group resource, wherein the message for instructing to release the group resource is used for instructing the target cell to release an air interface resource of the target cell and/or a group resource which is allocated to the target cell by the eNB.

In an example embodiment, sending, by the eNB, to the target cell the message for instructing to release the group resource comprises: judging, by the eNB, whether the target cell is a last cell in a current group call; when the target cell is not the last cell in the current group call, sending, by the eNB, to the target cell the message for instructing to release the group resource; and when the target cell is the last cell in the current group call, sending, by the eNB, to a trunking core network a request for releasing a group context; after receiving a command for releasing the group context from the trunking core network, sending, by the eNB, to the target cell the message for instructing to release the group resource, wherein the request for releasing a group context is used for requesting to release group resources of the group cells which belong to the eNB.

In an example embodiment, after sending, by the eNB, to the target cell the message for instructing to release the group resource, the method further comprises: receiving, by the eNB, from the target cell a message for indicating that the group resource is released completely; and sending, by the eNB, to a trunking core network a message for updating resources of adjacent cells, wherein the message for updating the resources of the adjacent cells comprises a message for establishing resources of group cells of the eNB, and the message for updating the resources of the adjacent cells is used for instructing eNBs where the adjacent cells of the target cell are located to update resources of the target cell to air interface resources.

In an example embodiment, after sending, by the eNB, to the trunking core network the message for updating the resources of the adjacent cells, the method further comprises: receiving, by the trunking core network, from the eNB a message for updating resources of adjacent cells; and sending, by the trunking core network, to the eNB where the adjacent cells of the target cell in the trunking core network are located, the message for updating the resources of the adjacent cells.

In an example embodiment, the eNB determines the target cell from the group cells which belong to the eNB in at least one of the following manners: determining a cell of which wireless resource bearer establishment is failed as the target cell; determining a cell at which no users locates within a preset period as the target cell; and determining a cell of which a cell group resource is not used by any user within a preset period as the target cell.

According to another aspect of the disclosure, a group resource release method, comprising: receiving, by a cell, a message for instructing to release a group resource from an evolved Node B, eNB, wherein the message for instructing to release the group resource is used for instructing the cell to release an air interface resource of the cell and/or a group resource which is allocated to the cell by the eNB; and releasing, by the cell, the group resource of the cell according to the message for instructing to release the group resource.

According to another aspect of the disclosure, a group resource release device, applied to an evolved Node B, eNB, comprising: a determining component, configured to determine, from group cells which belong to the eNB, a target cell which needs to release a group resource; and a sending component, configured to send to the target cell a message for instructing to release the group resource, wherein the message for instructing to release the group resource is used for instructing the target cell to release an air interface resource of the target cell and/or a group resource which is allocated to the target cell by the eNB.

In an example embodiment, the sending component comprises: a judging element, configured to judge whether the target cell is a last cell in a current group call; a first sending element, configured to, when the target cell is not the last cell in the current group call, send to the target cell the message for instructing to release the group resource; and a second sending element, configured to, when the target cell is the last cell in the current group call, send to a trunking core network a request for releasing a group context, and after receiving a command for releasing the group context from the trunking core network, send to the target cell the message for instructing to release the group resource, wherein the request for releasing a group context is used for requesting to release group resources of the group cells which belong to the eNB.

According to another aspect of the disclosure, a group resource release device, applied to a cell, comprising: a receiving component, configured to receive a message for instructing to release the group resource from an evolved Node B, eNB, wherein the message for instructing to release the group resource is used for instructing the cell to release an air interface resource of the cell and/or a group resource which is allocated to the cell by the eNB; and a releasing component, configured to release the group resource of the cell according to the message for instructing to release the group resource.

According to another aspect of the disclosure, a group resource release system, comprising: an evolved Node B, eNB, a target cell and a trunking core network, wherein the eNB comprises any one of the above group resource release devices, and the target cell is a cell which is determined from group cells of the eNB to need to release a group resource, and the target cell comprises the above group resource release device.

Through the embodiments of the disclosure, the eNB determines from group cells which belong to the eNB, a target cell which needs to release a group resource; the eNB sends to the target cell a message for instructing to release the group resource, wherein the message for instructing to release the group resource is used for instructing the target cell to release an air interface resource of the target cell and/or a group resource which is allocated to the target cell, which solves the problems that the releasing speed of the group call resource in the group call is slow and the utilization rate is low, thus improving effectively the utilization rate of the group call resources in the group call.

BRIEF DESCRIPTION OF THE DRAWINGS

Drawings, provided for further understanding of the embodiment of the disclosure and forming a part of the specification, are used to explain the disclosure together with embodiments of the disclosure rather than to limit the disclosure. In the accompanying drawings.

DESCRIPTION OF EMBODIMENTS

It should be noted that the embodiments and the characteristics of the embodiments can be combined with each other if no conflict is caused. The embodiment of the disclosure will be explained below with reference to the drawings and in conjunction with the embodiments in detail.

Figure 1:
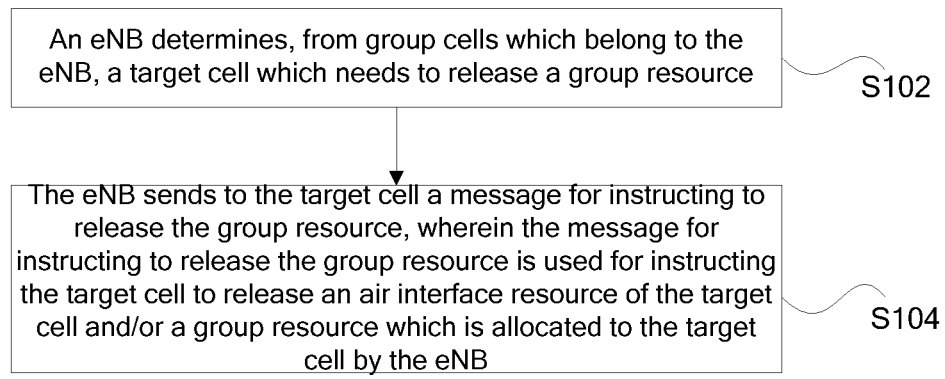
FIG. 1 is a flowchart of a group resource release method according to an embodiment one of the disclosure.

A group resource release method is provided in an embodiment of the disclosure; FIG. 1 is a flowchart of a group resource release method according to the embodiment one of the disclosure, and as shown in FIG. 1, the method comprises the following steps:

Step S102, An eNB determines, from group cells which belong to the eNB, a target cell which needs to release a group resource; and Step S104, The eNB sends to the target cell a message for instructing to release the group resource, wherein the message for instructing to release the group resource is used for instructing the target cell to release an air interface resource of the target cell and/or a group resource which is allocated to the target cell by the eNB.

Through the above steps, the eNB determines, from group cells which belong to the eNB, the target cell which needs to release the group resource; and the eNB sends to the target cell the message for instructing to release the group resource, wherein the message for instructing to release the group resource is used for instructing the target cell to release an air interface resource of the target cell and/or the group resource which is allocated to the target cell by the eNB. For releasing the group resources (i.e. group call resources) of an eNB level, by releasing the invalid group call resources in the group call resources, it is solved the problems that the releasing speed of the group call resource in the group call is slow and the utilization rate is low, thus improving effectively the utilization rate of the group call resources in the group call.

Actually, when releasing the group resource, the target cell would send a message for releasing a cell resource in a shared channel of the cell, and when there is a User Equipment (UE) in the cell, the UE in the cell will release own resources of the UE after receiving the message.

In an optional manner, sending, by the eNB, to the target cell the message for instructing to release the group resource may comprise the following steps: the eNB judges whether the target cell is a last cell in a current group call; when the target cell is not the last cell in the current group call, the eNB sends to the target cell the message for instructing to release the group resource; and when the target cell is the last cell in the current group call, then eNB sends to a trunking core network a request for releasing a group context; after receiving a command for releasing the group context from the trunking core network, the eNB sends to the target cell the message for instructing to release the group resource, wherein the request for releasing a group context is used for requesting to release group resources of the group cells which belong to the eNB. By using the optional manner, when the cell is the last cell in the current group call, the group call resources of the group are released, thereby further improving the utilization rate of the group call resources.

During implementation, after the eNB sends to the target cell the message for instructing to release the group resource, the method may further comprise the following steps: the eNB receives from the target cell a message for indicating that the group resource is released completely; the eNB sends to a trunking core network a message for updating resources of adjacent cells, wherein the message for updating the resources of the adjacent cells comprises a message for establishing resources of group cells of the eNB, and the message for updating the resources of the adjacent cells is used for instructing the eNBs where the adjacent cells of the target cell are located to update the resources of the target cell to an air interface resources. By using the optional manner, the resource information of the eNB after resource releasing can be reported to a trunking core network in time so as to fully use the released group call resources.

After the above step that the eNB sends the message for updating the resources of the adjacent cells to a trunking core network, the method further comprises the following steps: the trunking core network receives an message for updating resources of adjacent cells from the eNB; and the trunking core network sends the message for updating the resources of the adjacent cells to the eNBs where the adjacent cells of the target cell in the trunking core network is located. By using the optional manner, resource information of the eNB of an adjacent cell can be updated in time by the trunking core network so as to fully use the released group call resources.

In an optional manner, the eNB determines the target cell from the group cells which belong to the eNB in at least one of the following manners: determining a cell of which wireless resource bearer establishment is failed as the target cell; determining a cell at which no users locates within a preset period as the target cell; and determining a cell of which a cell group resource is not used by any user within a preset period as the target cell. By using the optional manner, invalid group call resources are determined simply and reliably.

Figure 2:
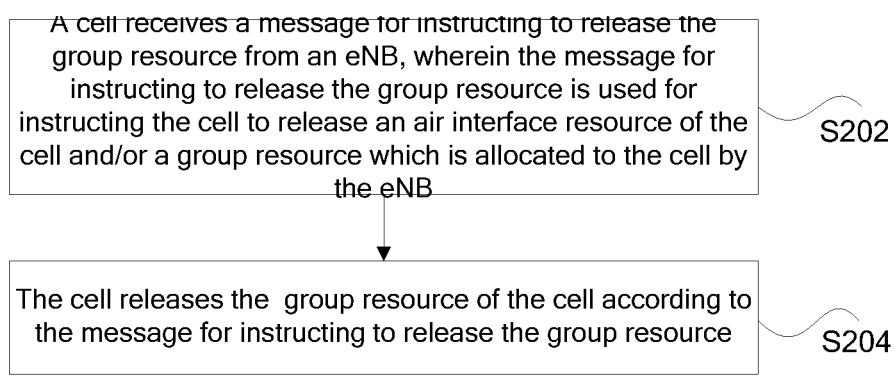
FIG. 2 is a flowchart of a group resource release method according to embodiment two of the disclosure.

A group resource release method is further provided in the embodiments of the disclosure; FIG. 2 is a flowchart of a group resource release method according to embodiment two of the disclosure, and as shown in FIG. 2, the method comprises the following steps:

Step S202, A cell receives a message for instructing to release the group resource from an eNB, wherein the message for instructing to release the group resource is used for instructing the cell to release an air interface resource of the cell and/or a group resource which is allocated to the cell by the eNB; and Step S204, The cell releases the group resource of the cell according to the message for instructing to release the group resource.

Through the above steps, the cell receives the message for instructing to release the group resource from the eNB, wherein the message for instructing to release the group resource is used for instructing the cell to release an air interface resource of the cell and/or a group resource which is allocated to the cell by the eNB; and the cell releases the group resource of the cell according to the message for instructing to release the group resource. For releasing the group resources of an eNB level, by releasing the invalid group call resources in the group call resources, it is solved the problems that the releasing speed of the group call resource in the group call is slow and the utilization rate is low, thus improving effectively the utilization rate of the group call resources in the group call.

Figure 3:
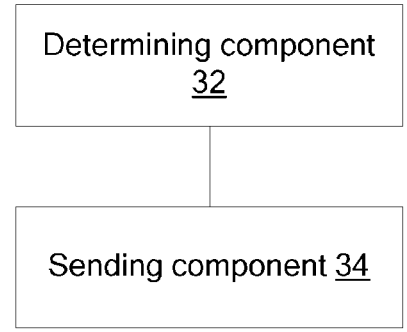
FIG. 3 is a structure diagram of a group resource release device according to embodiment one of the disclosure.

A group resource release device is further provided in the embodiment of the disclosure, which is applied to the eNB, and the device may be configured to realize the group resource release method as shown in the above FIG. 1 and optional embodiments thereof. FIG. 3 is a structure diagram of a group resource release device according to embodiment one of the disclosure; as shown in FIG. 3, the device comprises: a determining component 32 and a sending component 34, wherein the determining component 32 is configured to determine, from group cells which belong to the eNB, a target cell which needs to release a group resource; the sending component 34, coupled to the determining component 32, is configured to send to the target cell a message for instructing to release the group resource, wherein the message for instructing to release the group resource is used for instructing the target cell to release an air interface resource of the target cell and/or a group resource which is allocated to the target cell by the eNB.

Through the above device, the determining component 32 is configured to determine, from group cells which belong to the eNB, a target cell which needs to release the group resource; and the sending component 34 sends to the target cell the message for instructing to release the group resource, wherein the message for instructing to release the group resource is used for instructing the target cell to release an air interface resource of the target cell and/or the group resource which is allocated to the target cell by the eNB. For releasing the group resources of an eNB level, by releasing the invalid group call resources in the group call resources, it is solved the problems that the releasing speed of the group call resource in the group call is slow and the utilization rate is low, thus improving effectively the utilization rate of the group call resources in the group call.

Figure 4:
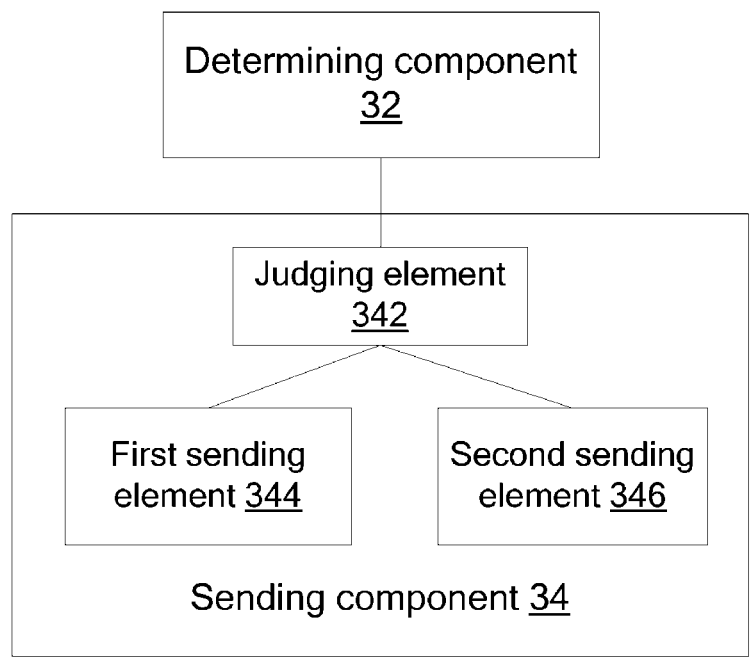
FIG. 4 is an example structure diagram of a group resource release device according to embodiment one of the disclosure.

FIG. 4 is an example structure diagram of a group resource release device according to embodiment one of the disclosure; as shown in FIG. 4, optionally, the above sending component 34 may comprise: a judging element 342, a first sending element 344 and a second sending element 346, wherein the judging element 342 is coupled to the determining component 32 and is configured to judge whether the target cell is a last cell in a current group call; the first sending element 344 is coupled to the judging element 342 and is configured to, when the target cell is not the last cell in the current group call, send to the target cell the message for instructing to release the group resource; the second sending element 346 is coupled to the judging element 342 and is configured to, when the target cell is the last cell in the current group call, send to a trunking core network a request for releasing a group context, and after receiving a command for releasing the group context from the trunking core network, send to the target cell the message for instructing to release the group resource, wherein the request for releasing a group context is used for requesting to release group resources of the group cells which belong to the eNB.

Figure 5:
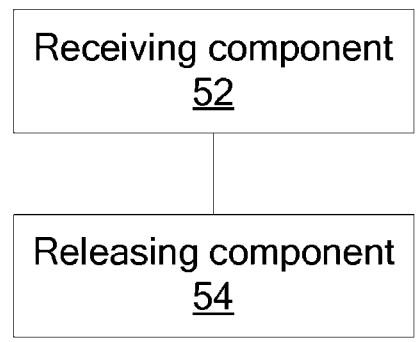
FIG. 5 is a structure diagram of a group resource release device according to embodiment two of the disclosure.

A group resource releasing device is further provided in the embodiment of the disclosure, which is applied to a cell. FIG. 5 is a structure diagram of a group resource release device according to embodiment two of the disclosure; as shown in FIG. 5, the device comprises: a receiving component 52 and a releasing component 54, wherein the receiving component 52 is configured to receive a message for instructing to release the group resource from an eNB, wherein the message for instructing to release the group resource is used for instructing the cell to release an air interface resource of the cell and/or a group resource which is allocated to the target cell by the eNB; and a releasing component 54, which is coupled to the receiving component 52 and is configured to release the group resource of the cell according to the message for instructing to release the group resource.

Through the above device, the receiving component 52 is configured to receive the message for instructing to release the group resource from the eNB, wherein the message for instructing to release the group resource is used for instructing the cell to release an air interface resource of the cell and/or a group resource which is allocated to the cell by the eNB; and a releasing component 54 releases the group resource of the cell according to the message for instructing to release the group resource. For releasing the group resources of an eNB level, by releasing the invalid group call resources in the group call resources, it is solved the problems that the releasing speed of the group call resource in the group call is slow and the utilization rate is low, thus improving effectively the utilization rate of the group call resources in the group call.

Figure 6:
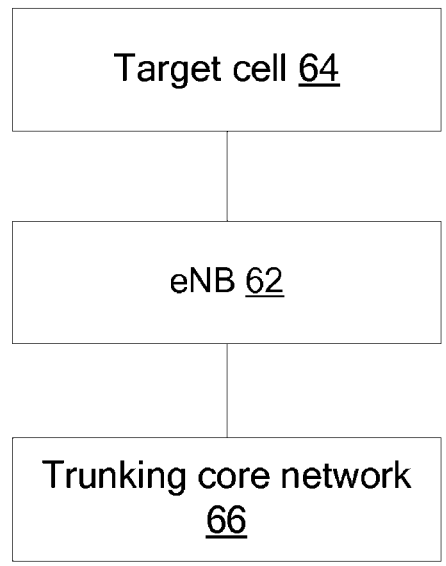
FIG. 6 is a structure diagram of a group resource release system according to an embodiment of the disclosure.

A group resource release system is further provided in the embodiments of the disclosure; FIG. 6 is a structure diagram of a group resource release system according to an embodiment of the disclosure; as shown in FIG. 6, the system comprises an eNB 62, a target cell 64 and a trunking core network 66, wherein the eNB 62 is connected to the target cell 64, comprising the above group resource release device as shown in FIG. 3 or FIG. 4; the target cell 64 is a cell which is determined from group cells of the eNB to need to release a group resource, and the target cell comprises the above group resource release device as shown in FIG. 5, and the trunking core network 66 is connected to the eNB 62.

Through the above system, the group resource release device in the cell releases the group call resources according to the instruction of the group resource release device in the eNB. For releasing the group resources of an eNB level, by releasing the invalid group call resources in the group call resources, it is solved the problems that the releasing speed of the group call resource in the group call is slow and the utilization rate is low, thus improving effectively the utilization rate of the group call resources in the group call.

It should be noted that the group resource release device or group resource release described in the above device embodiments corresponds to the above method embodiments, with the specific implementation described in the method embodiment in detail, thereby needing no further description.

The implementation process of the embodiment of the disclosure will be described in detail by referring to the example embodiments, to make the technical solutions and implementation process of the disclosure more evident.

Figure 7:
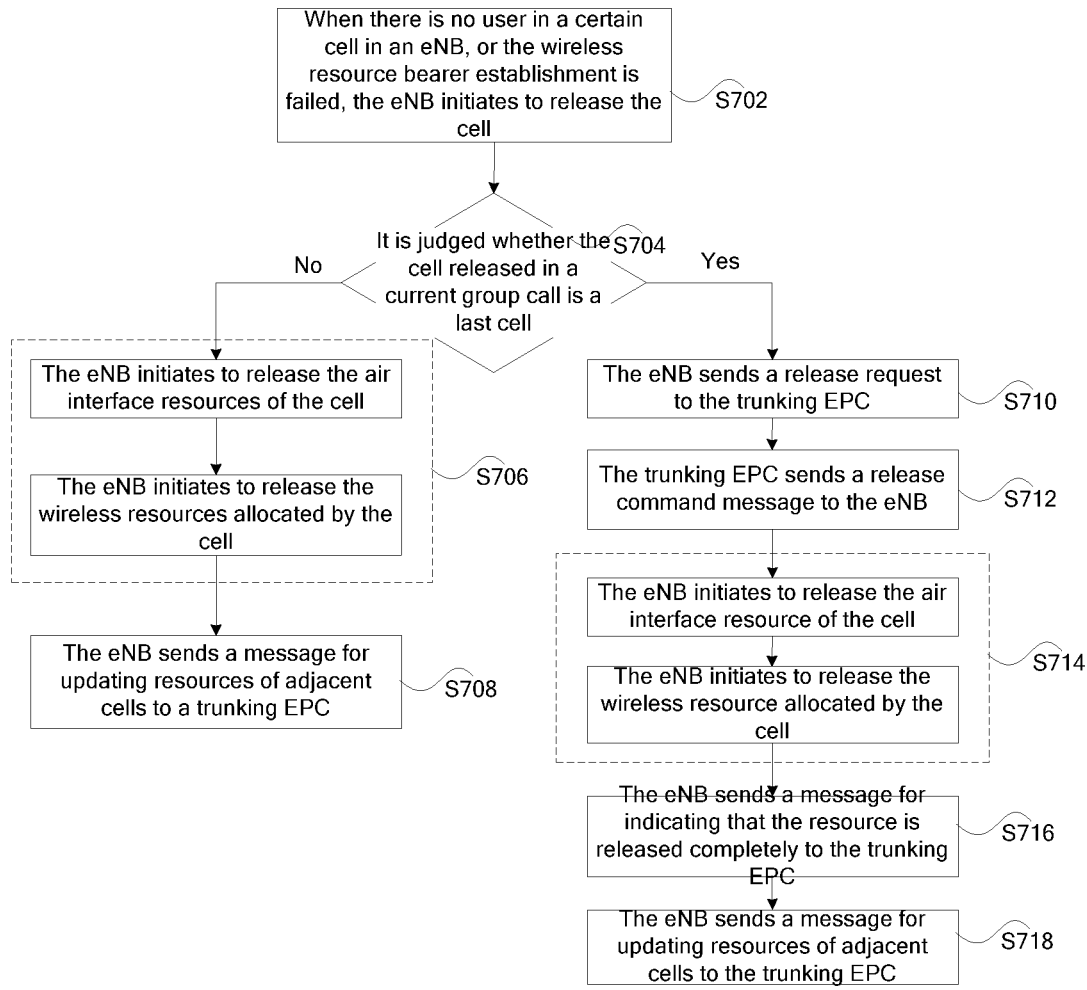
FIG. 7 is a flowchart of a group resource release method according to an example embodiment of the disclosure.

FIG. 7 is a flowchart of a group resource release method according to an example embodiment of the disclosure; as shown in FIG. 7, the method comprises the following steps:

Step S702, When an eNB finds that there is no user in a certain cell in a trunking call, or the wireless resource bearer establishment is failed, the eNB will initiate a process to release the resource of the cell.

Step S704, The eNB judges whether the above cell which is about to release resources is a last cell in the group call. When the above cell which is about to release resources is not the last cell in the group call, step S706 is executed, and when the above cell which is about to release resources is the last cell in the group call, step S710 is executed.

Step S706, Cell resource release is performed. By releasing the air interface wireless resource and the group resource of the cell of the eNB, the group resource of the cell is released completely. It should be noted that releasing the air interface wireless resource and releasing the group resource of the cell of the eNB is not in order.

Step S708, The eNB sends a message for updating resources of adjacent cells to a trunking Evolved Packet Core (EPC). After the group resource of the cell is released completely, the cell group resource establishment situation of the eNB is told to an eNB where the adjacent cell of the cell is located by sending a message for updating resources of adjacent cells to the trunking EPC, so that the adjacent eNB is facilitate to update the resources of the adjacent cell (i.e. the cell releasing resources) to an air interface.

Step S710, The eNB sends a release request message to the trunking EPC, wherein the release request message carries a group call ID needing to be released and a release reason. From this step, the eNB initiates a process to release the group call resource of the group under the eNB.

Step S712, The trunking EPC sends a release command message to the eNB after receiving the release request message.

Step S714, After receiving the release command message from the trunking EPC, the eNB initiates a flow to release the cell group resource. The flow comprises: the eNB initiates to release an air interface resource of a cell; and the eNB initiates to release the wireless resource allocated by the cell. It should be noted that releasing the air interface wireless resource and releasing the group resource of the cell of the eNB is not in order.

Step S716, The eNB sends a message for indicating that the resource is released completely to the trunking EPC.

Step S718, The eNB sends a message for updating resources of adjacent cells to the trunking EPC.

Through the above steps, the group resource is initiated to release by a certain eNB, the group call resources of the invalid cells in a group call can be efficiently and quickly released, thus improving the capacity of a trunking system; after the group call resource of the eNB is released completely, the released group call resource may be used in the call of other groups, which improves the utilization rate of the group call resource in the trunking group call.

Figure 8:
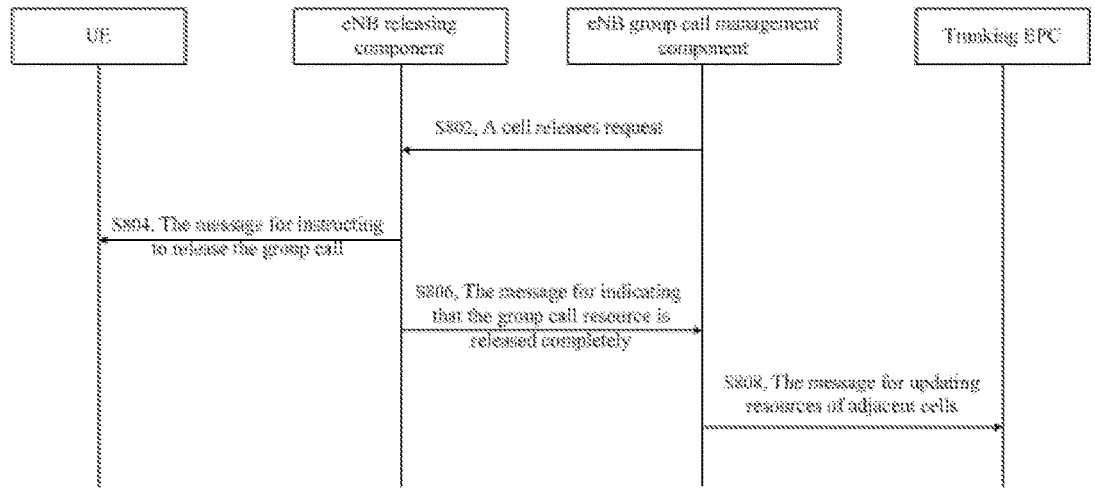
FIG. 8 is an interactive flowchart one of a group resource release method according to an example embodiment of the disclosure.

FIG. 8 is an interactive flowchart one of a group resource release method according to an example embodiment of the disclosure; as shown in FIG. 8, the method comprises the following steps:

Step S802, when a certain cell in an eNB group call management component in the eNB needs to release group call resources, and the eNB finds that the cell is not the last cell of the group call, in this case, the eNB group call management component sends a cell release request to an eNB releasing component in the eNB. When a certain cell in the eNB group call management component in the eNB needs to release the group call resources, the release reason may comprise: establishment for a service bearer is failed, or there is no users in the cell in a long time.

Step S804, After receiving the cell release request, the eNB releasing component sends a message for instructing to release the group call to a UE of the cell by an air interface. The UE releases the cell air interface resource according to the message for instructing to release the group call, and at the same time, the eNB releasing component releases the group resources of the eNB.

Step S806, After releasing the air interface resource and the group resource completely, the eNB releasing component sends a message for indicating that the group call resource is released completely to the eNB group call management component.

Step S808, After receiving the message for indicating that the group call resource is released completely from the eNB releasing component, the eNB group call management component, sends a message for updating resources of adjacent cells to a trunking EPC, thus the wireless resource situation of the present eNB may be told to other eNBs adjacent to the present eNB through the trunking EPC, so that other adjacent eNBs are facilitate to update the wireless resource information of the group adjacent cell in time.

Figure 9:
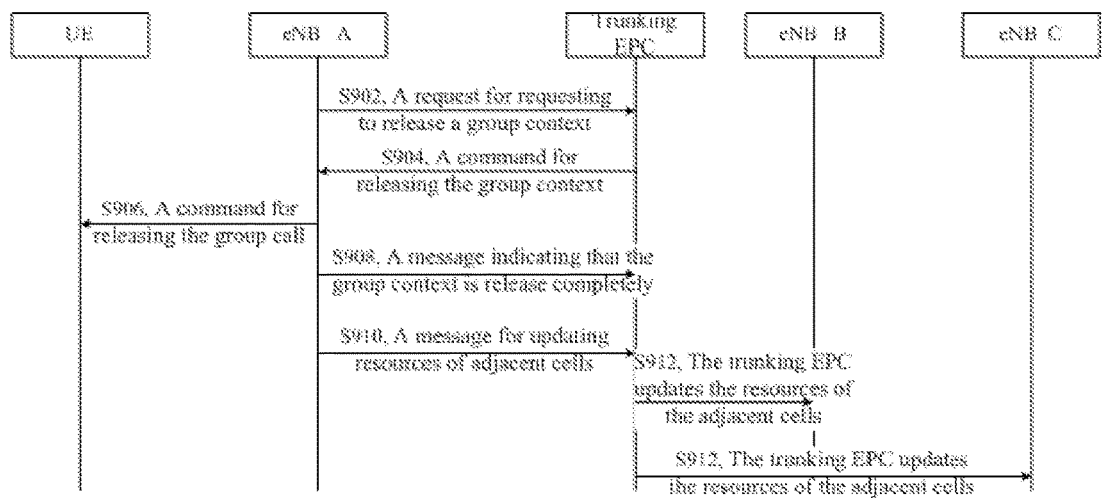
FIG. 9 is an interactive flowchart two of a group resource release method according to an example embodiment of the disclosure.

FIG. 9 is an interactive flowchart two of a group resource release method according to an example embodiment of the disclosure; FIG. 9 describes a processing flow in the case that a cell which needs to release group call resources is the last cell in the current group call which is determined by the eNB; and as shown in FIG. 9, the method comprises the following steps:

Step S902, When the eNB releases the cell, the eNB finds that the cell is the last cell in the group call. In this case, the eNB will release the whole group resources. The eNB sends a request for releasing a group context to a trunking EPC. The eNB initiates to release the resources of the group call, so that the released group resources may be served by the call of other group call.

Step S904, After receiving the request for releasing a group context, the trunking EPC sends a command for releasing the group context to the eNB.

Step S906, After receiving the command for releasing the group context, the eNB sends a command for releasing the group call to a UE, and releases resources, such as air interface wireless resources and eNB group call resources of the non-released cells.

Step S908, After the group call resource is released completely, the eNB sends a message indicating that the group context is release completely to the trunking EPC.

Step S910, After the eNB finishes sending the message indicating that the group context is released completely to the trunking EPC, the eNB sends a message for updating resources of adjacent cells to the trunking EPC, so as to report establishment information of the resource of a group cell of the present eNB.

Step S912, The trunking EPC sends the above message for updating resources of adjacent cells of the eNB to other eNBs adjacent to the above eNB (as shown in FIG. 9, the present eNB is shown by using "eNB A" in the figure, and the adjacent eNBs of the present eNB are shown by using "eNB B" and "eNB C" in the figure).

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

In summary, through the above embodiments and example embodiments of the disclosure, a group resource release method, device and system are provided, and a manner of a group call resource release of an eNB level is used to release invalid group call resources in the group call resources, which solves the problems of low release speed and low utilization rate of group call resources in a trunking group call, effectively improving the utilization rate of the group call resources in the group call.

Obviously, those skilled in the art shall understand that the above components and steps of the embodiments of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. Thus, the embodiments of the disclosure are not limited to any particular combination of hardware and software.

The above description is only example embodiments of the disclosure and is not intended to limit the disclosure, and the disclosure can have a variety of changes and modifications for ordinary person skilled in the field. Any modification, equivalent replacement, or improvement made within the spirit and principle of the disclosure shall all fall within the protection scope of the disclosure.

INDUSTRIAL APPLICABILITY

The technical solution of the embodiments of the disclosure may be applied to the field of trunking communications, which solves the problems that the releasing speed of the group call resource in the group call is slow and the utilization rate is low, thus improving effectively the utilization rate of the group call resources in the group call.

What is claimed is:

1. A group resource release method, comprising:
    determining, by an evolved Node B, eNB, from group cells which belong to the eNB, a target cell which needs to release a group resource;
    sending, by the eNB, to the target cell a message for instructing to release the group resource, wherein the message for instructing to release the group resource is used for instructing the target cell to release an air interface resource of the target cell and a group resource which is allocated to the target cell by the eNB.

2. The method according to claim 1, wherein sending, by the eNB, to the target cell the message for instructing to release the group resource comprises:
    judging, by the eNB, whether the target cell is a last cell in a current group call;
    when the target cell is not the last cell in the current group call, sending, by the eNB, to the target cell the message for instructing to release the group resource; and
    when the target cell is the last cell in the current group call, sending, by the eNB, to a trunking core network a request for releasing a group context; after receiving a command for releasing the group context from the trunking core network, sending, by the eNB, to the target cell the message for instructing to release the group resource, wherein the request for releasing a group context is used for requesting to release group resources of the group cells which belong to the eNB.

3. The method according to claim 1, wherein after sending, by the eNB, to the target cell the message for instructing to release the group resource, the method further comprises:
    receiving, by the eNB, from the target cell a message for indicating that the group resource is released completely; and
    sending, by the eNB, to a trunking core network a message for updating resources of adjacent cells, wherein the message for updating the resources of the adjacent cells comprises a message for establishing resources of group cells of the eNB, and the message for updating the resources of the adjacent cells is used for instructing eNBs where the adjacent cells of the target cell are located to update resources of the target cell to air interface resources.

4. The method according to claim 3, wherein after sending, by the eNB, to the trunking core network the message for updating the resources of the adjacent cells, the method further comprises:
receiving, by the trunking core network, from the eNB a message for updating resources of adjacent cells; and
sending, by the trunking core network, to the eNB where the adjacent cells of the target cell in the trunking core network are located, the message for updating the resources of the adjacent cells.

5. The method according to claim 1, wherein the eNB determines the target cell from the group cells which belong to the eNB in at least one of the following manners:
determining a cell of which wireless resource bearer establishment is failed as the target cell;
determining a cell at which no users locates within a preset period as the target cell; and
determining a cell of which a cell group resource is not used by any user within a preset period as the target cell.

6. A group resource release method, comprising:
receiving, by a target cell, a message for instructing to release a group resource from an evolved Node B, eNB, wherein the message for instructing to release the group resource is used for instructing the cell to release an air interface resource of the cell and a group resource which is allocated to the cell by the eNB; and
releasing, by the target cell, the group resource of the cell according to the message for instructing to release the group resource.

7. A group resource release device, applied to an evolved Node B, eNB, comprising:
a determining component, configured to determine, from group cells which belong to the eNB, a target cell which needs to release a group resource; and
a sending component, configured to send to the target cell a message for instructing to release the group resource, wherein the message for instructing to release the group resource is used for instructing the target cell to release an air interface resource of the target cell and a group resource which is allocated to the target cell by the eNB.

8. The device according to claim 7, wherein the sending component comprises:
a judging element, configured to judge whether the target cell is a last cell in a current group call;
a first sending element, configured to, when the target cell is not the last cell in the current group call, send to the target cell the message for instructing to release the group resource; and
a second sending element, configured to, when the target cell is the last cell in the current group call, send to a trunking core network a request for releasing a group context, and after receiving a command for releasing the group context from the trunking core network, send to the target cell the message for instructing to release the group resource, wherein the request for releasing a group context is used for requesting to release group resources of the group cells which belong to the eNB.

9. A group resource release device, applied to a target cell, comprising:
a receiving component, configured to receive a message for instructing to release the group resource from an evolved Node B, eNB, wherein the message for instructing to release the group resource is used for instructing the cell to release an air interface resource of the cell and a group resource which is allocated to the cell by the eNB; and
a releasing component, configured to release the group resource of the cell according to the message for instructing to release the group resource.

10. A group resource release system, comprising: an evolved Node B, eNB, a target cell and a trunking core network, wherein the eNB comprises the group resource release device, and the target cell is a cell which is determined from group cells of the eNB to need to release a group resource, and the target cell comprises the group resource release device,
wherein the group resource release device is applied to the eNB, and the group resource release device comprises:
a determining component, configured to determine, from group cells which belong to the eNB, a target cell which needs to release a group resource; and a sending component, configured to send to the target cell a message for instructing to release the group resource, wherein the message for instructing to release the group resource is used for instructing the target cell to release an air interface resource of the target cell and a group resource which is allocated to the target cell by the eNB;
the group resource release device is applied to a target cell, and the group resource release device comprises:
a receiving component, configured to receive a message for instructing to release the group resource from the eNB, wherein the message for instructing to release the group resource is used for instructing the cell to release an air interface resource of the cell and a group resource which is allocated to the cell by the eNB; and
a releasing component, configured to release the group resource of the cell according to the message for instructing to release the group resource.

11. The method according to claim 2, wherein after sending, by the eNB, to the target cell the message for instructing to release the group resource, the method further comprises:
receiving, by the eNB, from the target cell a message for indicating that the group resource is released completely; and
sending, by the eNB, to a trunking core network a message for updating resources of adjacent cells, wherein the message for updating the resources of the adjacent cells comprises a message for establishing resources of group cells of the eNB, and the message for updating the resources of the adjacent cells is used for instructing eNBs where the adjacent cells of the target cell are located to update resources of the target cell to air interface resources.

12. The method according to claim 11, wherein after sending, by the eNB, to the trunking core network the message for updating the resources of the adjacent cells, the method further comprises:
receiving, by the trunking core network, from the eNB a message for updating resources of adjacent cells; and
sending, by the trunking core network, to the eNB where the adjacent cells of the target cell in the trunking core network are located, the message for updating the resources of the adjacent cells.

13. The method according to claim 2, wherein the eNB determines the target cell from the group cells which belong to the eNB in at least one of the following manners:
determining a cell of which wireless resource bearer establishment is failed as the target cell;

determining a cell at which no users locates within a preset period as the target cell; and determining a cell of which a cell group resource is not used by any user within a preset period as the target cell.

\* \* \* \* \*